US012759817B2

(12) United States Patent
Tödter

(10) Patent No.: US 12,759,817 B2
(45) Date of Patent: Oct. 13, 2026

(54) METHOD AND ARRANGEMENT FOR LOADING A DRIVERLESS TRANSPORT VEHICLE FOR INDIVIDUAL PRODUCTS

(71) Applicant: Dematic GmbH, Heusenstamm (DE)

(72) Inventor: Joachim Tödter, Hamburg (DE)

(73) Assignee: Dematic GmbH, Heusenstamm (DE)

( * ) Notice: Subject to any disclaimer, the term of this patent is extended or adjusted under 35 U.S.C. 154(b) by 393 days.

(21) Appl. No.: 18/557,422

(22) PCT Filed: Apr. 20, 2022

(86) PCT No.: PCT/EP2022/060444
§ 371 (c)(1),
(2) Date: Oct. 26, 2023

(87) PCT Pub. No.: WO2022/228970
PCT Pub. Date: Nov. 3, 2022

(65) Prior Publication Data

US 2024/0217760 A1 Jul. 4, 2024

(30) Foreign Application Priority Data

Apr. 28, 2021 (DE) ......................... 102021110926.4

(51) Int. Cl.
*B65G 67/22* (2006.01)
*B65G 13/02* (2006.01)

(52) U.S. Cl.
CPC .............. *B65G 67/22* (2013.01); *B65G 13/02* (2013.01); *B65G 2203/0208* (2013.01); *B65G 2203/0283* (2013.01); *B65G 2207/42* (2013.01)

(58) Field of Classification Search
CPC ........ B65G 37/00; B65G 65/00; B65G 13/02; B65G 67/22
See application file for complete search history.

(56) References Cited

U.S. PATENT DOCUMENTS

| | | | | |
|---|---|---|---|---|
| 5,701,989 A * | 12/1997 | Boone | B65G 47/684 198/786 |
| 11,485,590 B2 * | 11/2022 | Aschpurwis | B65G 47/945 |

(Continued)

FOREIGN PATENT DOCUMENTS

| | | |
|---|---|---|
| CN | 208018986 U | 10/2018 |
| DE | 2717199 A1 | 11/1978 |

(Continued)

OTHER PUBLICATIONS

Preliminary Report on Patentability of the International Searching Authority in English from corresponding Patent Cooperation Treaty (PCT) Application No. PCT/EP2022/060444, issued Oct. 24, 2023.

(Continued)

*Primary Examiner* — Kaitlin S Joerger
(74) *Attorney, Agent, or Firm* — Gardner, Linn, Burkhart & Ondersma LLP

(57) ABSTRACT

A method and arrangement for loading a driverless transport vehicle for individual products with an individual product, wherein the individual product is transferred from a delivery station to the driverless transport vehicle, and the driverless transport vehicle is in motion during the acceptance, wherein the individual product is accelerated for the transfer from the delivery station and leaves the latter at such a speed and the spacing of the driverless transport vehicle from the delivery station is so great that the individual product passes through a flight phase between leaving the delivery station and landing on the driverless transport vehicle moving at a normal transport speed.

20 Claims, 7 Drawing Sheets

(56) References Cited

U.S. PATENT DOCUMENTS

| | | | | |
|---|---|---|---|---|
| 2013/0054005 | A1 | 2/2013 | Stevens et al. | |
| 2015/0021142 | A1* | 1/2015 | Morgan | B61B 1/00 198/324 |
| 2020/0048019 | A1* | 2/2020 | Werner | B65G 17/002 |

FOREIGN PATENT DOCUMENTS

| | | | |
|---|---|---|---|
| DE | 102008039764 | A1 | 5/2010 |
| DE | 202018101313 | U1 | 4/2018 |
| DE | 102019122055 | A1 | 2/2021 |
| EP | 3757045 | A1 | 12/2020 |
| WO | 2020242695 | A1 | 12/2020 |

OTHER PUBLICATIONS

International Search Report and Written Opinion of the International Searching Authority in English from corresponding Patent Cooperation Treaty (PCT) Application No. PCT/EP2022/060444, indicated completed on Aug. 18, 2022.

Screenshots from https://www.youtube.com/watch?v=hlAbmQ9kZOs by Fraunhofer IML, entitled "Loadrunner—High-Speed Swarm for Digital Platform Economy", uploaded Nov. 27, 2019.

* cited by examiner

METHOD AND ARRANGEMENT FOR LOADING A DRIVERLESS TRANSPORT VEHICLE FOR INDIVIDUAL PRODUCTS

CROSS REFERENCE TO RELATED APPLICATION

The present application is a national stage application of PCT/EP 2022/060444 filed on Apr. 20, 2022, which claims the benefit of German Application 10 2021 110 926.4, filed on Apr. 28, 2021.

TECHNICAL FIELD AND BACKGROUND

Method and arrangement for loading a driverless transport vehicle for individual products The invention relates to a method and an arrangement for loading a driverless transport vehicle for individual products, wherein the individual product is transferred from a delivery station to the driverless transport vehicle, and the driverless transport vehicle is moving during the transfer.

Transport vehicles, in particular autonomous or driverless transport vehicles which are used to carry products, are known. For instance, US 2013/054005 A1 discloses so-called autonomous "bots" which move mobile racks.

Corresponding transport vehicles for individual products or goods to be loaded are also known e.g. from CN 208018986 U, in which the product lies on a loading surface on the top side of the transport vehicle.

DE 10 2019 122 055 A1 likewise describes a small autonomous transport vehicle for individual products which stabilises a product received on a loading surface on the vehicle during movement by virtue of the fact that a higher wall is provided on one side of the loading surface. The vehicle is always turned during transport of the product such that the acceleration when moving off, when driving round corners and during deceleration urges the product against this higher wall. Therefore, the product is prevented from falling off.

In order to deliver the individual product, the movement vector of the vehicle is changed immediately before or upon arrival at an unloading station and the vehicle, before arrival at the unloading station, is oriented by the vehicle controller and/or by at least one guide device disposed in the region of the unloading station in such a way that the trajectory of the product moving away from the loading surface due to the change of the velocity vector ends in a receiving area of the unloading station. In other words, the product continues to move along the original vector prior to the change and thus slides off the loading surface of the transport vehicle owing to the gravitational force or inertia of the movement.

Conversely, it is similarly known to load the corresponding vehicle with an individual product, for which purpose the individual product is loaded onto the vehicle via conveyors in a conventional manner or is received by the vehicle by being swept off (cf. https://www.youtube.com/watch?v=hIAbmQ9kZOs). However, for this purpose the vehicles must either stop or at least be greatly slowed down.

SUMMARY

In contrast, the present invention provides an improved option for loading the vehicles which does not have the above disadvantages, and above all is quicker.

In accordance with an embodiment of the invention it has been recognised that when the individual product is accelerated for the transfer from the delivery station and leaves the latter at such a speed and the distance between the driverless transport vehicle and the delivery station is of such a size that the individual product passes through a flight phase between leaving the delivery station and landing on the driverless transport vehicle moving at a normal transport speed, the individual product can be transferred without slowing down. Therefore, the driverless transport vehicle does not have to stop or slow down.

The individual product is supplied to transfer points e.g. using conveyor belts or roller conveyors. The individual products flow at speeds of 4 m/s which is usual nowadays. During transfer to the driverless transport vehicle, the individual product should not be decelerated, otherwise this would lead to congestion. In contrast, it is advantageous to transfer the individual product to the driverless transport vehicles at higher speed so that the driverless transport vehicles are at a greater distance with respect to each other than the individual products on the conveyor system used to supply the products.

In other words, the individual product is slung for transfer to the moving driverless transport vehicle because it is accelerated to such a high speed that when it leaves the delivery station or the end of the conveying path it does not simply fall down but continues to move freely. The individual product thus flies through the air without any support or contact and the driverless transport vehicle catches it at the end of the calculated flight path.

In the present case, "flight phase" means that there is no contact between the individual product and the delivery station or the transport vehicle during this movement phase. The individual product is also not supported, carried or borne in any other way. Passive flying through the air occurs.

Optionally, the invention is used in warehouses, distribution centres or parcel processing centres in which all individual products or parcels along with their properties and characteristics, in particular dimensions, mass or weight and position of centre of gravity, are known. Accordingly, the delivery station will be connected to a supply conveyor system of the corresponding overall system and, via this, be supplied with the corresponding respective individual products which are then to be "reloaded" onto the corresponding driverless transport vehicle in the delivery station.

The properties and characteristics of the individual product can thus be used to calculate the required accelerations or speeds and, in turn, to calculate the flight paths or trajectories therefrom.

For instance, the driverless transport vehicle moving at a normal transport speed can move in a manner synchronised to the flight path of the individual product in order to catch the flying individual product on its loading surface in a targeted manner. In other words, owing to the known properties and the flight path which can thus be pre-calculated therefrom, the transport vehicle can be moved to the landing point of the individual product in a targeted manner, in order to catch the individual product from its loading surface at the correct time synchronised to the flight path and flight speed.

For instance, the delivery station can have a sensor system at the in-feed in order to determine the identity of the respective individual product.

In accordance with an embodiment of the invention, it has been found that a particularly suitable speed of the individual product is in the range between 5 m/s and 15 m/s when leaving the delivery station. For this purpose, the conveyor system can be activated at the corresponding acceleration by means of the known data of the individual product. In principle, any type of conveyor system able to provide such speeds is suitable as the conveyor system, in particular with individual products having a weight between 1 kg and 100 kg, in particular up to 30 kg, and usual dimensions.

Individual products or parcels having usual dimensions are less than or equal to L=675 mm, W=450 mm, H=240 mm, preferably less than or equal to L=480 mm, W=360 mm, H=150 mm.

The conveyor system can be an accordingly designed, typical roller conveyor or a belt conveyor. In addition or alternatively, other designs are feasible as alternative solutions. In addition to the gravitational force, the pressing force can be increased by an additional roller conveyor above the individual product, which conveyor acts on the individual product with a defined force (e.g. per spring pretensioning, hydraulically applied, applied by electric motor). Alternatively, the individual product can be accelerated by lateral pressing rollers. In this case, a dedicated drive for the rollers beneath the individual product can be obviated.

Another solution can involve pushing the individual product by a pushing mechanism. When the individual product arrives at the transfer roller conveyor, the mechanism is raised so that the individual product can pass beneath it. After the individual product has passed, the pusher is lowered and then accelerated linearly in the direction of the delivery. For the linear drive, an electric motor-driven spindle output, hydraulic cylinders or pneumatic cylinders can be used. In addition to pushing, it is also feasible for the linear drive to be coupled to the individual product by means of a negative pressure from the side or from the front, and for this coupling to be released after the acceleration phase shortly before the launch.

The conveyor system in the delivery station will usually be configured such that it extends substantially horizontally and ends at the delivery end of the conveyor path. However, it is also feasible for the conveyor path to not extend horizontally at the delivery end but instead to be inclined upwards in the manner of a ramp so that the individual product leaves the delivery station at a positive angle deviating from the horizontal. This has the advantage that the individual product lands on the driverless transport vehicle at a relatively small pitch angle: the pitch movement produced when leaving the delivery station, i.e. a rotation, extending through its centre of gravity, about the transverse axis is pre-compensated for by the positive angle of approach.

It is also feasible for the angle of approach to be variable depending upon the properties of the individual product.

Therefore, an excessive pitch of the individual product can be counteracted so that the individual product does not pitch by more than 20° where possible.

The pitch of the individual product or parcels is a result of the movement imposed upon the parcel as soon as the centre of gravity of the parcel goes beyond the "launch edge" but the remainder of the parcel behind this is still supported. During this time, the parcel undergoes a rotational movement; during flight it then rotates further.

This means that the pitch angles when landing on the driverless transport vehicle are dependent upon the parcel length, the speed and the flight phase or flight path. By comparing different parameter combinations, the inventors have surprisingly found that pitch angles of up to 20° are particularly suitable for a soft landing. For considerably higher values, the landing on the driverless transport vehicle is too hard.

A further embodiment resides in the fact that the conveyor system is lowered as a whole after reaching the final speed or at the end of the acceleration process so that the individual product continues to fly parallel to the conveyor system without a pitch movement. In the previous variant, the individual product undergoes a pitch movement when moving over the edge (end of the conveyor system) when the individual product "tips over the edge". If the conveyor system is "pulled away" in parallel beneath the individual product by lowering, the product flies on the path of the "launch parabola" and can land in parallel on the driverless transport vehicle, without the pitch movement.

Therefore, it can be expedient if the delivery station has a delivery end which is variable in terms of angle and/or height.

The driverless transport vehicle is an industry-standard driverless vehicle, equipped with a running gear unit, either having at least one steered wheel or having an arrangement of wheels which permits omnidirectional driving behaviour. Furthermore, at least one wheel is provided with a drive which can accelerate the vehicle to the required speed of 5 m/s. Higher travel speeds of 10 m/s or 15 m/s are likewise possible and advantageous in order to increase the throughput during transport in particular on longer transport paths. Furthermore, the driverless vehicle has a controller, in combination with sensors and also a communications device. It is possible to determine the vehicle's position in the warehouse using the sensors. They can be e.g. laser scanners, by means of which the position can be determined by means of triangulation from the measurement of the distance with respect to marked and known points (such as reflectors). In addition, its position relative to the transfer station can be determined in order to increase the accuracy of the positioning during load transfer. On the basis of the known position, the driverless transport vehicle can, by means of the controller, plan a trajectory to the transfer point for the transfer point in time of the individual product, which is communicated to the vehicle via the communications unit either in bidirectional exchange with the transfer station from the latter or from a central control entity which controls the transfer station and the vehicle. In the approach, the controller navigates the driverless transport vehicle on time to the load transfer point and confirms the correct approach towards the transfer station or to the central controller.

In accordance with an embodiment of the invention, the driverless transport vehicle is located as discussed above at the required point in time at the correct location at the end of the flight path in order to catch the individual products on its loading surface during the movement. Ideally, it has a speed corresponding to the individual product so that the individual product can land as smoothly as possible.

In order to ensure that the individual product slides down or falls when landing, it may nevertheless be expedient if the driverless transport vehicle has a possibly cushioned catch wall. Such a catch wall is then arranged at the front in the direction of travel of the transport vehicle and thus effectively stops any sliding where appropriate.

One aspect of the present invention is that the movement of the individual product or flight path thereof in the flight phase and the corresponding movement of the driverless transport vehicle are synchronised with each other in order for the random transport vehicle to be able to receive the individual product at the end of the flight phase or end of the flight path.

For this purpose, the synchronisation can be effected via a central controller which also performs, in addition to the corresponding calculations, the communication between the individual participating parties. Alternatively, it is also possible for bidirectional communication to take place between the delivery station and driverless transport vehicle for the time- and/or position-synchronisation of the transfer of the individual product.

For the communication between the controller or delivery station and the driverless transport vehicle, typical communications means can be used, e.g. WLAN or 4G, 5G with protocols based on e.g. MQTT or OPC-UA or DDS.

The invention not only relates to the method described above but also includes a corresponding arrangement of the driverless transport vehicle, the delivery station and a controller and, of course, at least one individual product. The delivery station comprises a controlled conveyor system having a delivery end for delivering the individual product to a loading surface of the driverless transport vehicle, wherein the conveyor system, controlled via the controller, accelerates the respective individual product to such a speed that the individual product, when leaving the delivery station via the delivery end of the conveyor system, passes through a flight phase between leaving the delivery station and landing on the driverless transport vehicle moving at a normal transport speed so that the movement of the driverless transport vehicle is synchronised to the flight path of the individual product via the controller.

It is understood that the flying transfer from the delivery station to the quickly-moving transport vehicles is in a protected region in which staff have no access or access is only permitted after corresponding approval and cessation of operation.

Typically, the delivery end of the delivery station will have, for instance, a vertical distance between 0.1 m and 0.3 m compared with the surface of the loading surface of the driverless transport vehicles.

Based on the predetermined take-off speeds and the vertical distances, the flight times of the individual products are in the range between 0.07 and 0.2 s. Accordingly, an individual product travels flight paths of 0.3 to 1.5 m depending upon the mass and initial speed, etc.

By means of the invention, the individual products can be delivered even more quickly than they can be supplied. Therefore, a high throughput is achieved.

In addition, the energy for the acceleration of the individual product does not have to be provided by the driverless transport vehicle, but rather the individual product is impressed by the stationary drive unit which is to be supplied with energy in a simpler manner than a vehicle having its limited energy content in the vehicle battery. Therefore, the driving time of the vehicles which only have to provide the frictional and drive losses is increased. If the vehicle, upon load delivery, is decelerated together with the load, some of the movement energy supplied with the individual product can even be recuperated in the vehicle. It would also be possible to recuperate some of the energy when the product lands in the vehicle.

Further details of the invention will become clear from the following description of exemplified embodiments by reference to the drawing.

DETAILED DESCRIPTION OF THE DRAWINGS

DETAILED DESCRIPTION OF THE PREFERRED EMBODIMENTS

In the figures, the acceleration of a parcel P is considered on a roller conveyor 2 of a delivery station 3 of an arrangement 1.

In accordance with the invention, the parcel P—for transfer to an AGV as a driverless transport vehicle in the delivery station 3—is accelerated to a speed of 5 m/s and is transferred or "slung" dynamically to the AGV 4 which is likewise moving at such a speed.

Figure 1:
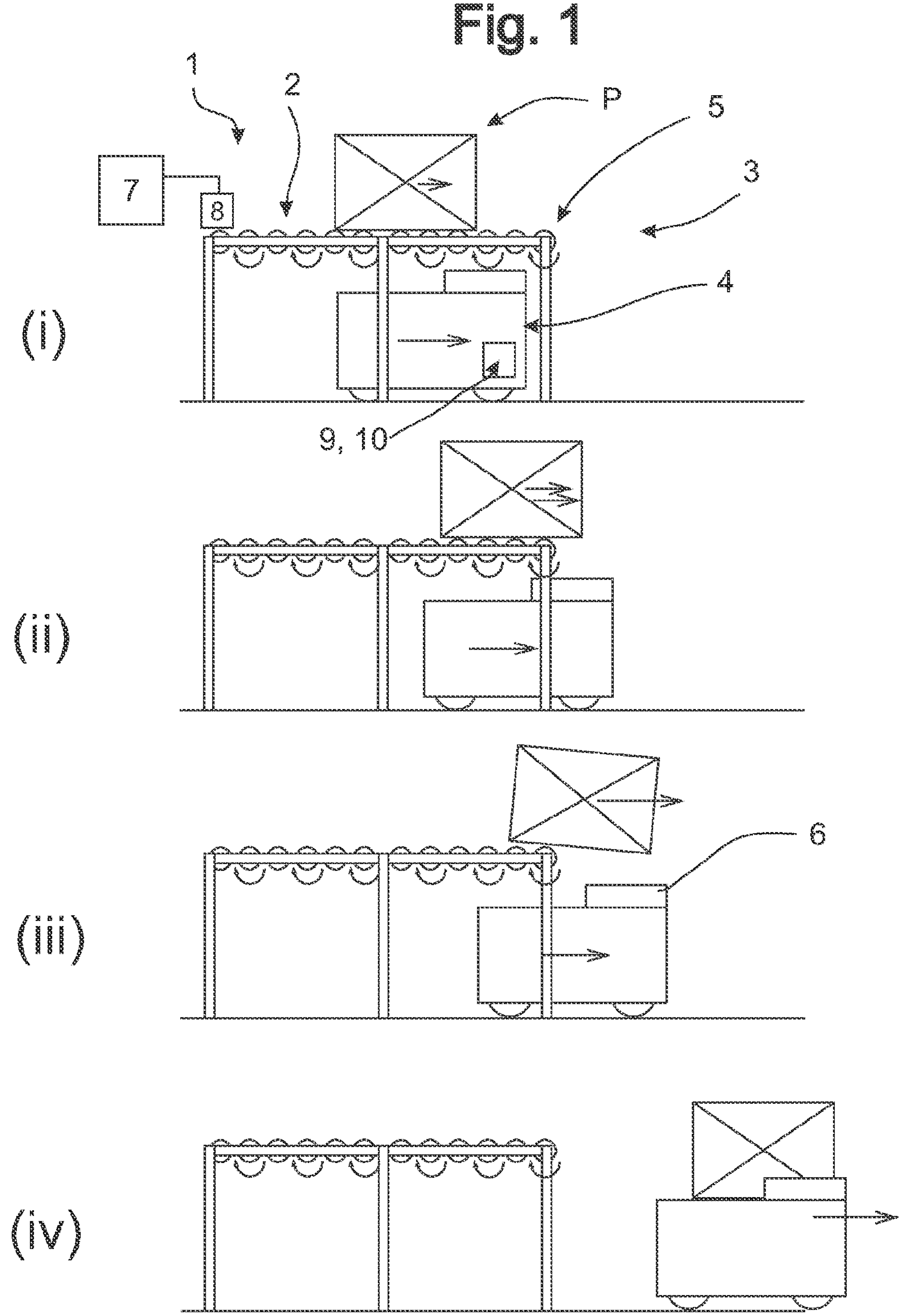
FIG. 1 shows a schematic side view of different stages of the "launch" of an individual product from a delivery station to a driverless transport vehicle.

FIG. 1 illustrates a driven roller conveyor 2 having a parcel P thereon, representative of any product. The parcel P is accelerated to the right on the roller conveyor, the rotational speed of the rollers, indicated by arrows beneath the rollers, increases with time. As an alternative to the roller conveyor, a belt conveyor could also be used, which receives the parcel on the left of the belt and during the transport accelerates the belt, and thus also the parcel, to the right.

An AGV 4 travels beneath the roller conveyor, synchronised in speed and position with the parcel P on the roller conveyor 2 so that the parcel P, after leaving the roller conveyor at the delivery end 5, passes through a flight phase at a speed of 5 m/s (step iii) and is thus slung onto the AGV 4 and caught thereby (step iv). In order to prevent the parcel P from slipping off the AGV 4, the latter comprises a cushioned, u-shaped (partially encompassing the loading surface) catch wall 6 placed at the front in the direction of travel.

The AGV 4 can travel directly beneath the roller conveyor 2, in parallel with the roller conveyor. However, it is also feasible for the AGV 4 to travel around a corner and only achieve a velocity vector in parallel with the roller conveyor at the point in time of the load transfer. This can have the advantage that the AGV 4 can guide a support, possibly required for stabilising the landing during travel, adjacent to the roller conveyor and the rollers can be positioned at a very short distance above the loading surface of the AGV so that the falling height or distance between the delivery end and the loading surface of the AGV becomes very short. This avoids stresses on the parcel caused by accelerations or the impact when landing on the AGV. The approach trajectories are not illustrated in the figures.

In addition, sensors 8 and controllers 7 are provided on the roller conveyor 2 and sensors 9 and controllers 10 are provided in the AGV 4, which determine the position and speed of the parcel P and also the position and speed of the AGV. The latter can be effected both in absolute terms, when the absolute position of its roller conveyor is assumed to be known, and also relative to the roller conveyor, in particular at the end 5 of the roller conveyor.

Furthermore, communication between the vehicle and delivery station is provided by means of the controllers 7, 10 in order to coordinate the transfer in terms of time and position. Alternatively, the coordination can be effected by a superordinate controller which, when a parcel arrives at the transfer roller conveyor, assigns the order to be picked up to an AGV and the travel of the AGV and the parcel movement on the roller conveyor are synchronised with each other.

In FIG. 1, the parcel lies on the roller conveyor under gravitational force and the acceleration energy is transferred by the frictional force which is based upon the intrinsic weight.

In other embodiments, alternative solutions are shown in order to improve the pressing force or transfer of the acceleration force to the parcel P.

Figure 2:
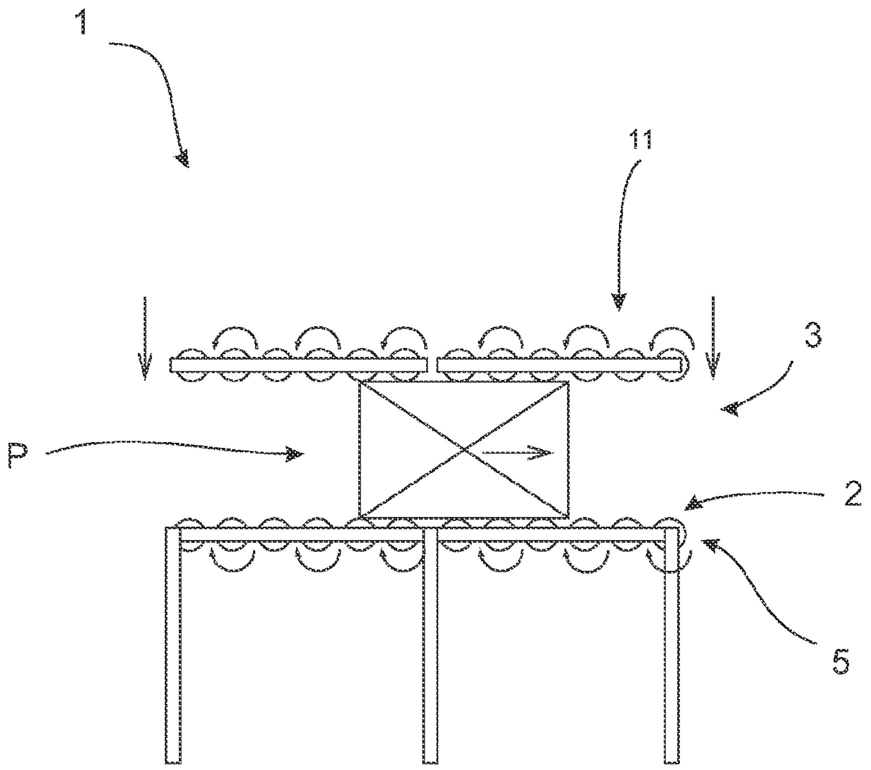
FIG. 2 shows a schematic side view of an alternative delivery station.

As shown in FIG. 2, in addition to the gravitational force, the pressing force can be increased by an additional roller conveyor 11 above the parcel P which acts on the parcel P from above with a defined force and clamps the parcel P between itself and the roller conveyor 2 (e.g. per spring pretensioning, hydraulically applied, applied by electric motor).

Figure 3:
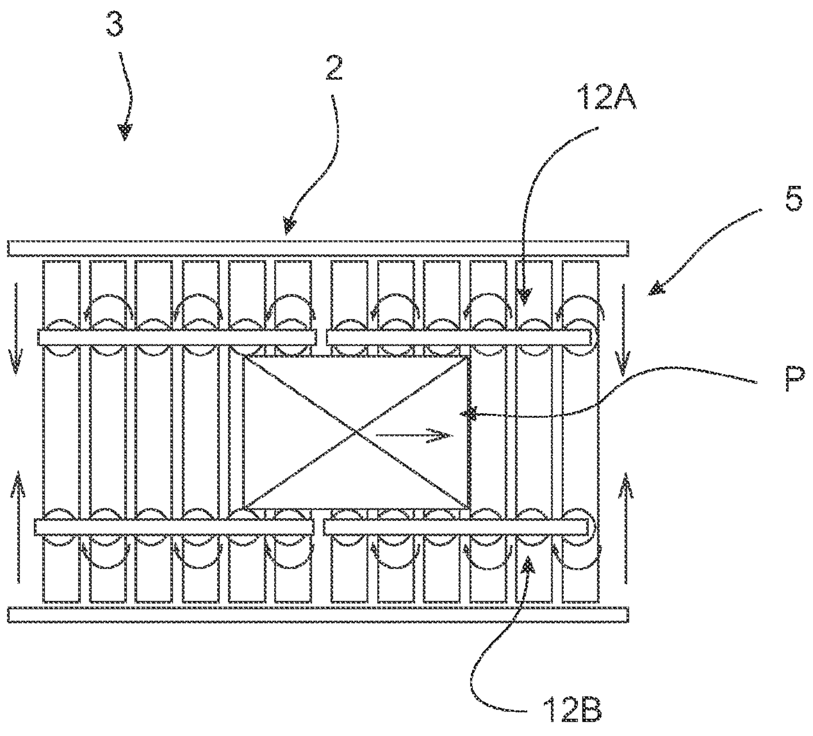
FIG. 3 shows a schematic plan view of another delivery station.

Alternatively, the parcel P can be accelerated by lateral pressing rollers 12A, B, as shown in FIG. 3, which clamp the parcel P therebetween. In this case, the roller conveyor 2 can be configured as a non-driven conveyor.

Figure 4:
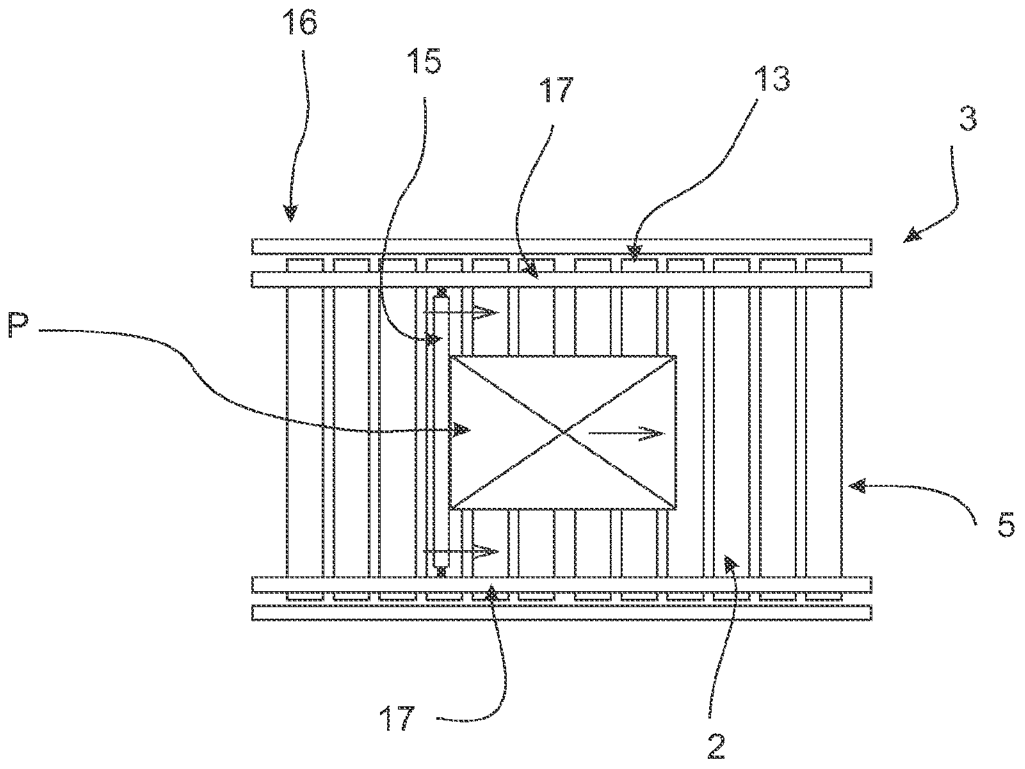
FIG. 4 shows a schematic plan view of another delivery station.
Figure 5:
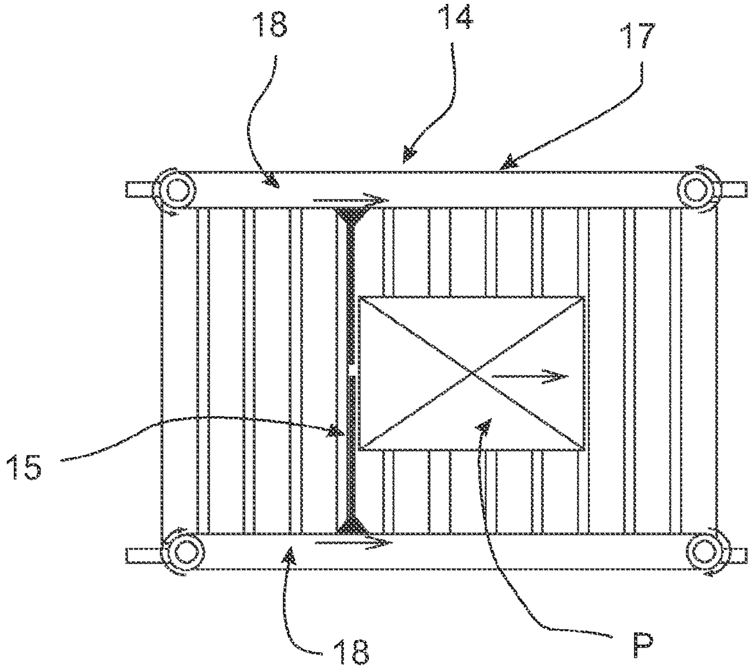
FIG. 5 shows a schematic plan view of another delivery station.

A further solution can involve pushing the parcel P by a pushing mechanism 13, 14, as shown in FIGS. 4 and 5. The pushing mechanism 13 of FIG. 4 includes a vertically movable transverse bar 15 which can be accelerated linearly in the direction of the delivery via parallel drives 17 arranged on both sides of the roller conveyor 2. For the linear drive, an electric motor-driven spindle output, hydraulic cylinders or pneumatic cylinders can be used (not shown).

When the parcel P arrives at the transfer roller conveyor 16, the transverse bar 15 is raised so that the parcel can pass beneath it. After the parcel P has passed, the transverse bar 15 is lowered and then accelerated linearly in the direction of the delivery.

According to FIG. 5, the drive 17 can be configured as a rotating, driven belt 18 having an entrainer 15 as the transverse bar for accelerating the parcel P. The belt drive 18 is controlled in such a manner that the parcel is accelerated in a targeted manner.

In addition to pushing, it is also feasible for the linear drive to be coupled to the parcel by means of a negative pressure from the side or from the front, and for this coupling to be released after the acceleration phase shortly before the launch.

Figure 6:
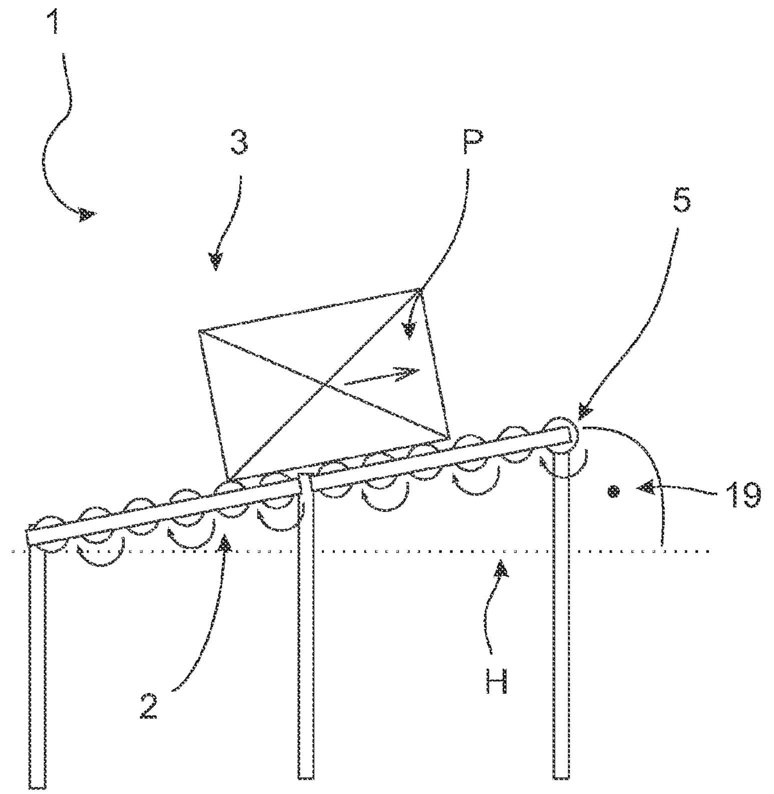
FIG. 6 shows a schematic side view of another delivery station.

According to FIG. 6, the delivery end 5 of the delivery station 3 can be inclined, i.e. designed at an angle 19 to the horizontal H in order to influence the flight path and in particular a pitch of the parcel P.

Figure 7:
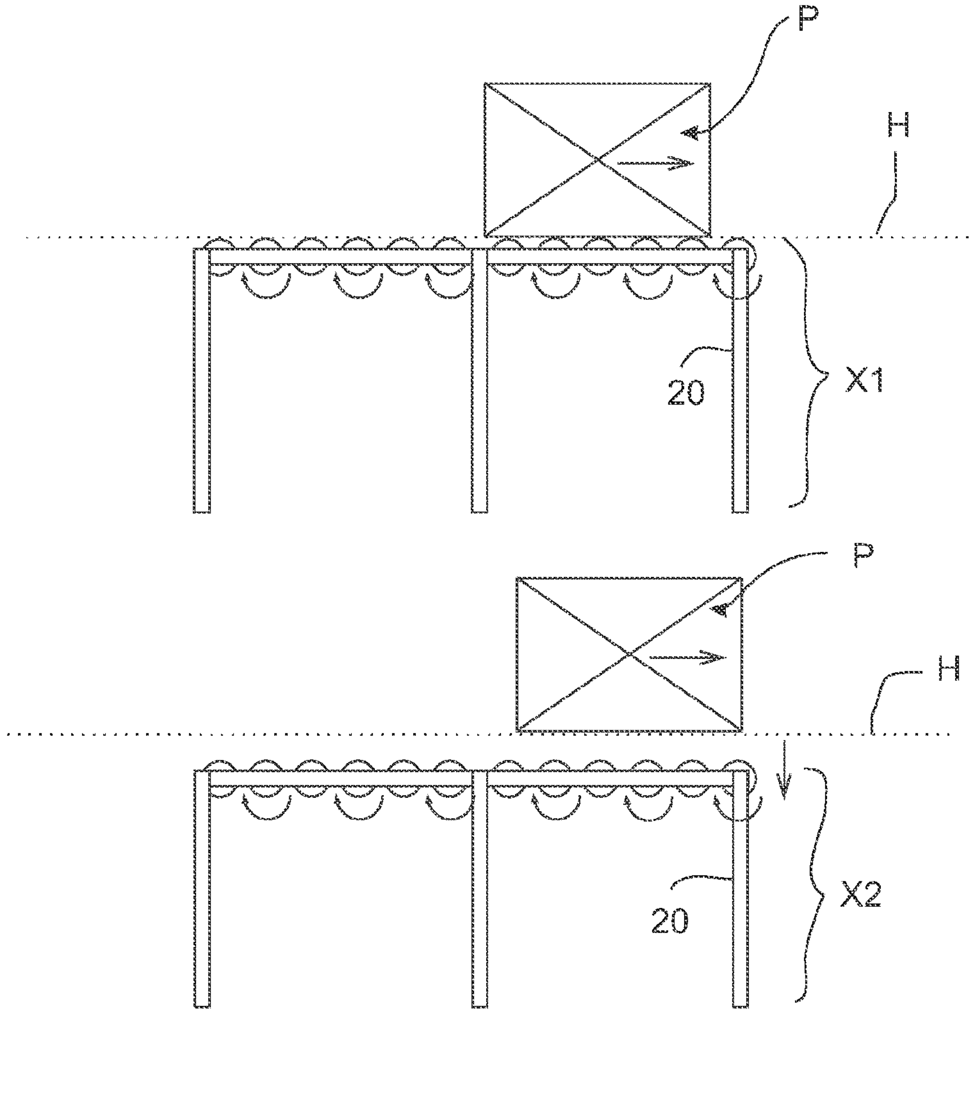
FIG. 7 shows a schematic side view of another delivery station.

In the variant shown in FIG. 7, the delivery station 3 has height-adjustable pillars 20 at the delivery end 5 so that the conveyor system can be lowered as a whole from a height X1 to a lower height X2 from the horizontal H after reaching the final speed or at the end of the acceleration process, so that the individual product continues to fly in parallel with the conveyor system without a pitch movement.

The invention claimed is:

1. A method for loading a driverless transport vehicle for individual products with an individual product, said method comprises:

transferring the individual product from a delivery station to the driverless transport vehicle;

moving the driverless transport vehicle during said transferring-;

accelerating the individual product for the transfer from the delivery station wherein the individual product leaves the delivery station at such a speed and the distance between the driverless transport vehicle and the delivery station is of such a size that the individual product passes through a flight phase between leaving the delivery station and landing on the driverless transport vehicle moving at a transport speed.

2. The method as claimed in claim 1, further comprising synchronizing the driverless transport vehicle to the flight path of the individual product in order to catch the flying individual product on its loading surface.

3. The method as claimed in claim 2, further comprising controlling that the speed of the individual product and the synchronisation of the movement of the driverless transport vehicle based on the properties of the individual product.

4. The method as claimed in claim 1, wherein said accelerating includes accelerating the individual product to a speed of at least 5 m/s.

5. The method as claimed in claim 1, wherein said accelerating the individual product includes accelerating the individual product such that the individual product leaves the delivery station at a positive angle deviating from the horizontal.

6. The method as claimed in claim 1, wherein the delivery station has a sensor system, further comprising determining the identity of the respective individual product with the sensor system.

7. The method as claimed in claim 1, wherein the delivery station has a delivery end, further comprising varying the angle and/or height of the delivery end.

8. The method as claimed in claim 1, further comprising providing the driverless transport vehicle with a cushioned catch wall.

9. The method as claimed in claim 1, further comprising providing bidirectional communication between the delivery station and driverless transport vehicle for time- and/or position-synchronisation of the transfer of the individual product.

10. An arrangement for loading a driverless transport vehicle for individual products with an individual product, said arrangement comprising:

a driverless transport vehicle for individual products;

a delivery station for individual products;

at least one individual product;

a controller, wherein the delivery station comprises a controlled conveyor system having a delivery end for delivering the individual product to a loading surface of the driverless transport vehicle, the conveyor system, controlled via the controller, accelerating the respective individual product to such a speed that the individual product, when leaving the delivery station via the delivery end of the conveyor system, passes through a flight phase between leaving the delivery station and landing on the driverless transport vehicle moving at a transport speed, and that the movement of the driverless transport vehicle is synchronised to the flight path of the individual product via the controller.

11. The apparatus as claimed in claim 10, wherein the delivery station has a sensor system to identity the respective individual product.

12. The apparatus as claimed in claim 10, wherein the delivery station has a delivery end, and the delivery end having a variable angle and/or height.

13. The apparatus as claimed in claim 10, wherein the driverless transport vehicle includes a cushioned catch wall.

14. The apparatus as claimed in claim 13, wherein the driverless transport vehicle has a front end in the direction of travel, and the cushioned catch wall arranged at the front of the driverless transport vehicle.

15. The apparatus as claimed in claim 10, further comprising a communication device to provide communication between the delivery station and driverless transport vehicle.

16. The apparatus as claimed in claim 15, wherein the communication device comprises a bidirectional communication device to provide bidirectional communication between the delivery station and driverless transport vehicle for time- and/or position-synchronisation of the transfer of the individual product.

17. The apparatus as claimed in claim 10, wherein the driverless vehicle includes a controller and a sensor to determine the vehicle's position.

18. The apparatus as claimed in claim 17, wherein the sensor comprises a laser scanner.

19. The apparatus as claimed in claim 10, wherein the delivery station has a plurality of rollers.

20. The apparatus as claimed in claim 19, wherein the plurality of rollers includes lateral pressing rollers.

* * * * *